United States Patent
Sun et al.

(10) Patent No.: US 7,551,387 B2
(45) Date of Patent: Jun. 23, 2009

(54) SERVO WRITING WITH OFFSET COMPENSATION FOR PREWRITTEN REFERENCE

(75) Inventors: Yu Sun, Fremont, CA (US); Dave McMurtrey, Loveland, CO (US); Bruce Liikanen, Berthoud, CO (US); Don Brunnett, Pleasanton, CA (US); John W. VanLaanen, Louisville, CO (US); Charles R. Watt, Longmont, CO (US); Stan Shepherd, Morgan Hill, CA (US); S. Craig Smith, Sunnyvale, CA (US); Todd Franks, Berthoud, CO (US); Lin Guo, Saratoga, CA (US)

(73) Assignee: Maxtor Corporation, Scotts Valley, CA (US)

( * ) Notice: Subject to any disclaimer, the term of this patent is extended or adjusted under 35 U.S.C. 154(b) by 90 days.

(21) Appl. No.: 11/740,747

(22) Filed: Apr. 26, 2007

(65) Prior Publication Data

US 2008/0030894 A1 Feb. 7, 2008

Related U.S. Application Data

(60) Provisional application No. 60/745,701, filed on Apr. 26, 2006.

(51) Int. Cl.
G11B 21/02 (2006.01)
(52) U.S. Cl. .............................. 360/75; 360/51; 360/48
(58) Field of Classification Search ........................ None
See application file for complete search history.

(56) References Cited

U.S. PATENT DOCUMENTS

| | | | |
|---|---|---|---|
| 5,668,679 A | 9/1997 | Swearingen et al. | |
| 5,793,559 A * | 8/1998 | Shepherd et al. | 360/78.09 |
| 5,978,426 A | 11/1999 | Glover et al. | |
| 6,411,461 B1 | 6/2002 | Szita | |
| 6,507,450 B1 | 1/2003 | Elliott | |
| 6,519,107 B1 | 2/2003 | Ehrlich et al. | |
| 6,735,031 B2 | 5/2004 | Chainer et al. | |
| 6,775,083 B2 | 8/2004 | Hilla, Jr. et al. | |
| 6,850,385 B1 | 2/2005 | Woods | |
| 6,940,678 B2 | 9/2005 | Kuo et al. | |
| 6,975,491 B2 | 12/2005 | Silverman | |
| 6,977,789 B1 | 12/2005 | Cloke | |
| 6,992,848 B1 | 1/2006 | Agarwal et al. | |
| 6,992,851 B1 | 1/2006 | Cloke | |
| 7,061,709 B2 | 6/2006 | Oki | |
| 7,068,459 B1 | 6/2006 | Cloke et al. | |
| 7,088,533 B1 * | 8/2006 | Shepherd et al. | 360/51 |
| 7,113,362 B1 | 9/2006 | Lee et al. | |
| 7,145,744 B1 | 12/2006 | Clawson et al. | |
| 7,154,697 B2 | 12/2006 | Toffle et al. | |
| 7,184,234 B2 | 2/2007 | Kim | |
| 7,333,280 B1 * | 2/2008 | Lifchits et al. | 360/51 |
| 2004/0100719 A1 * | 5/2004 | Wilson et al. | 360/75 |
| 2006/0209449 A1 * | 9/2006 | Ehrlich | 360/75 |

* cited by examiner

*Primary Examiner*—Jason C Olson
(74) *Attorney, Agent, or Firm*—Fellers, Snider, et al.

(57) ABSTRACT

In accordance with various embodiments, a rotatable member is mounted to a spindle hub so that initial servo data previously provided to the rotatable member are eccentrically offset with respect to a rotational center of the spindle hub. Compensation vales are determined to characterize said offset, after which final servo data are provided to the rotatable member in relation to the initial servo data and the determined compensation values. The final servo data are nominally concentric with the rotational center of the spindle hub.

22 Claims, 5 Drawing Sheets

SERVO WRITING WITH OFFSET COMPENSATION FOR PREWRITTEN REFERENCE

RELATED APPLICATIONS

The present application makes a claim of domestic priority to U.S. Provisional Patent Application No. 60/745,701 filed Apr. 26, 2006.

BACKGROUND

The present case is generally directed to servo data and more particularly, to the writing of final servo data based on initial servo data.

Servo data are often used in a control system to provide feedback positional control for a control object. In the environment of a data storage device, such data are used to detect and control the position of a read/write transducer adjacent a rotatable storage medium.

The servo data can be provided in a number of ways. In one approach, a servo track writer engages a data storage device to write an initial set of servo data to the storage media mounted therein. This initial servo data can take a number of forms, such as a series of spaced-apart spirals that extend across the media surfaces.

The storage device next enters a self-servo write mode in which final servo data are written to the media. The device uses the initial servo data to determine the appropriate locations to write the final servo data. This approach is particularly accurate since the media remain mounted to the same spindle hub during the writing of both the initial servo data and the final servo data.

SUMMARY

In accordance with various embodiments, a rotatable member is mounted to a spindle hub so that initial servo data previously provided to the rotatable member are eccentrically offset with respect to a rotational center of the spindle hub. Compensation vales are determined to characterize said offset, after which final servo data are provided to the rotatable member in relation to the initial servo data and the determined compensation values. The final servo data are nominally concentric with the rotational center of the spindle hub.

In accordance with some embodiments, a method comprises mounting a rotatable member to a spindle hub so that initial servo data previously provided to the rotatable member are eccentrically offset with respect to a rotational center of the spindle hub; determining compensation values to characterize said offset; and providing final servo data to the rotatable member in relation to the initial servo data and the determined compensation values, the final servo data nominally concentric with the rotational center of the spindle hub.

In accordance with other embodiments, an apparatus comprises a rotatable member mounted to a spindle hub so that initial servo data previously provided to the rotatable member are eccentrically offset with respect to a rotational center of the spindle hub; and a controller which determines compensation values to characterize said offset and which provides final servo data to the rotatable member in relation to the initial servo data and the determined compensation values, the final servo data nominally concentric with the rotational center of the spindle hub.

In accordance with other embodiments, an apparatus comprises a rotatable member mounted to a spindle hub so that initial servo data previously provided to the rotatable member are eccentrically offset with respect to a rotational center of the spindle hub; and first means for providing final servo data to the rotatable member in relation to the initial servo data, the final servo data nominally concentric with the rotational center of the spindle hub.

DETAILED DESCRIPTION

Figure 1:
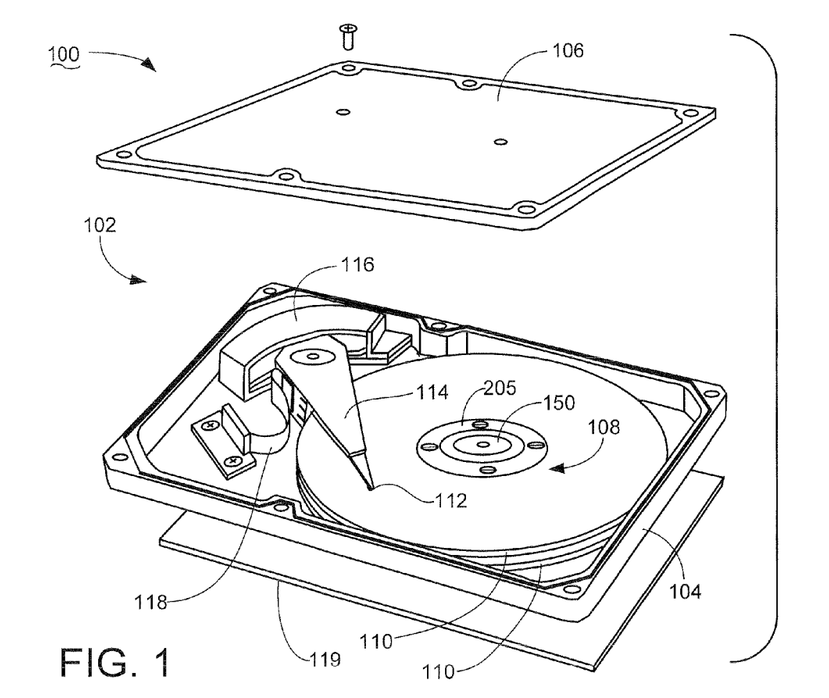
FIG. 1 is an exploded isometric view of an exemplary data storage device.

FIG. 1 provides a top plan view of a data storage device 100. The device 100 is provided to show an exemplary environment in which various embodiments can be advantageously practiced. It will be understood, however, that the claimed invention is not so limited.

The device 100 includes a housing 102 formed from a base deck 104 and top cover 106. An internally disposed spindle motor 108 is configured to rotate a number of storage media 110. An array of read/write transducers (heads) 112 access data tracks defined on the defined on the media surfaces to transfer data between the media 110 and a host device.

An actuator 114 moves the transducers 112 through application of current to a voice coil motor (VCM) 116. A flex circuit assembly 118 provides electrical communication paths between the actuator 112 and device control electronics on an externally disposed printed circuit board (PCB) 119.

Figure 2:
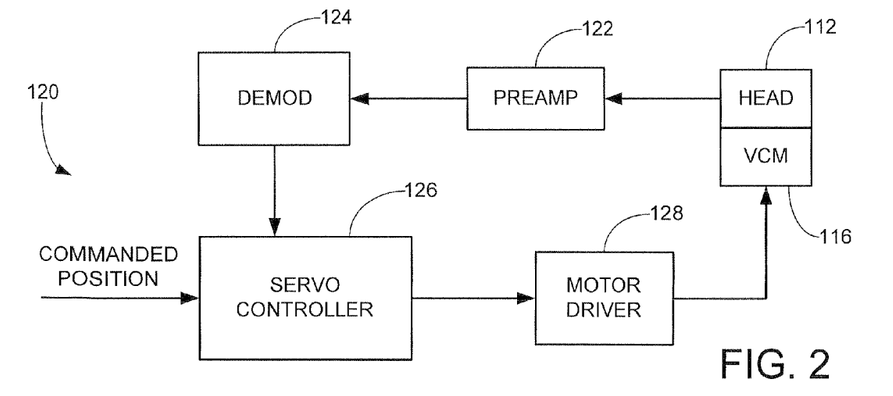
FIG. 2 provides a functional representation of a servo control circuit of the device of FIG. 1.

FIG. 2 provides a generalized functional block diagram for a closed loop servo control circuit 120 of the device 100. Embedded servo data are transduced from the media 110 by a selected transducer 112 and provided to a preamplifier/driver (preamp) circuit 122. The preamp circuit 122 preamplifies and filters the readback signals from the transducer 112, and provides the processed servo data to a demodulation (demod) circuit 124.

The demod circuit 124 detects and conditions the servo data, including application of automatic gain control (AGC) and conversion of the signals to digital form. A servo controller 126 processes the digitized servo data to generate a current command signal that is supplied to a motor driver circuit 128.

In response, the driver circuit 128 applies the appropriate current to the VCM 116 to position the transducer 112.

The servo controller 126 is preferably characterized as a programmable processor with associated servo code to direct the operation of the servo loop, although the controller can take other forms including being partially or fully realized in hardware. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

Figure 3:
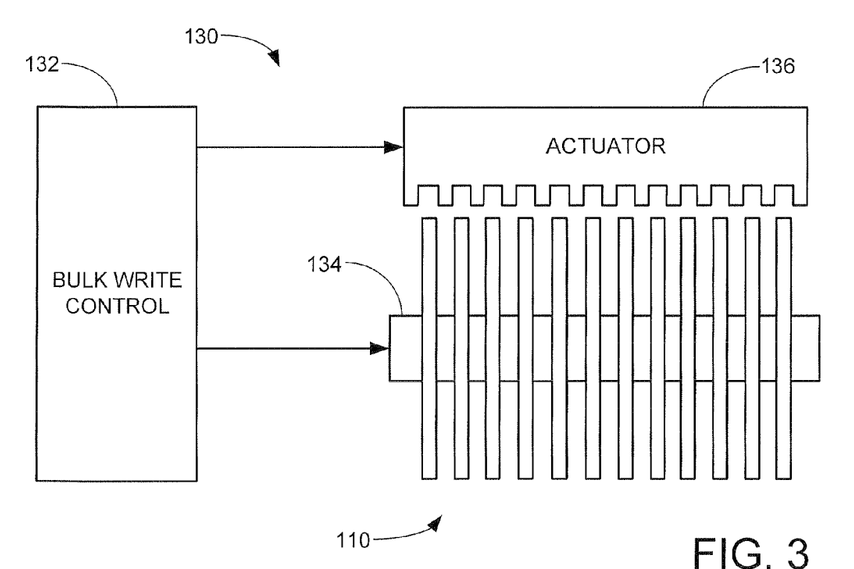
FIG. 3 generally depicts a bulk writer environment in which a multi-disc servo writer provides initial servo data to a number of storage media.

In accordance with various embodiments, initial servo data are written to the media 110 in a bulk writer environment using a multi-disc servo writer 130, as generally represented in FIG. 3. The writer 130 concurrently generates the initial servo data on a relatively large population of the media 110.

Preferably, a control block 132 controls a spindle hub 134 to concurrently rotate the media 110 while an array of transducers supported by an actuator 136 access the media to write the initial servo data. Alternative methods can be used, however, including a printing operation to print the initial servo data to the population of media. It will be noted that the initial servo data are provided to the media 110 prior to installation of the media into a data storage device.

Figure 4:
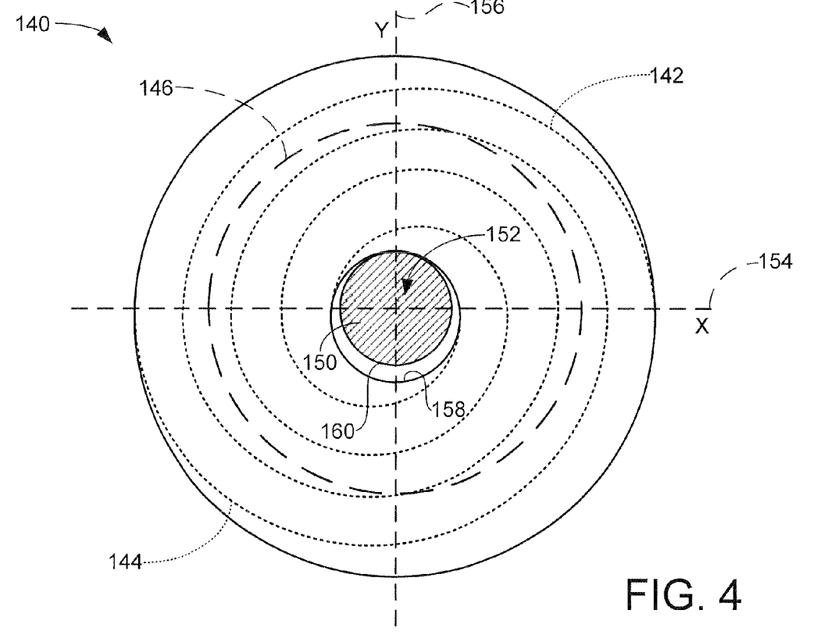
FIG. 4 generally illustrates eccentricity issues that can arise once a disc from FIG. 3 is mounted into a storage device such as in FIG. 1.

A particular storage medium that has been processed by the writer 130 is generally depicted at 140 in FIG. 4. The initial servo data comprise a series of spaced apart spirals, two of which are depicted at 142, 144. The spiral servo patterns extend radially in a substantially helix form across the medium 110A from an outermost diameter (OD) to an innermost diameter (ID) of the associated recording surface. The servo patterns preferably provide positional data that continuously extend across the radial surface.

While only two exemplary servo patterns are shown, preferably a larger population of such patterns (e.g., 200-400 spirals) are provided in a substantially uniformly spaced apart relation about the medium 140. The rates at which the spiral servo patterns advance across the media surface will be a function of a number of factors, such as the rotational velocity of the hub 134 and the radial velocity imparted to the transducers by the actuator 136 in FIG. 3.

The servo spiral patterns 142, 144 are preferably used to generate final servo data that define adjacent concentric servo data tracks on the media, such as generally represented at 146. The final servo data are arrayed as a series of spaced apart, embedded servo wedges that extend radially across the surfaces of the medium 140. Each servo wedge preferably includes synchronization, automatic gain control (AGC), header, track address (e.g., Grey code), and intra-track positional information (e.g., A-F dibit patterns). Preferably, the number of initial servo spirals is selected to be greater than the number of final embedded servo wedges, although such is not required.

The concentric servo data tracks 146 are preferably written during a self-servo write operation by the device 100 after the medium 140 has been installed onto a hub 150 of the spindle motor 108. The final servo data tracks 146 are nominally centered about a rotational center 152 of the hub 150, which is shown to be at the intersection of orthogonal x and y axis lines 154, 156.

Due to mechanical alignment and balancing issues, the spiral servo patterns 142, 144 may not necessarily be centered about the rotational center 152 of the hub 150 when the medium 140 is placed onto the hub. Rather, the spiral servo patterns may be eccentrically offset from this rotational center, such as exemplified in FIG. 4.

More specifically, an inner sidewall 158 of the medium 140 defines a central aperture through the medium to allow passage of the medium down onto the hub 150. The spiral servo patterns 142, 144 are contemplated as being symmetrically disposed about the center (midpoint) of this aperture. However, the sidewall 158 has been advanced in FIG. 4 so as to be in contacting abutment with an outer annular surface 160 of the hub 150 on one side, leaving a substantial gap on the opposite side. Index marks or similar (not shown) may be provided on the media during the processing of FIG. 3 to aid in such alignment of the medium 140 onto the hub 150.

Such alignment of the medium 140 with respect to the hub 150 results in an eccentric offset of the spiral servo data 142, 144 with respect to the rotational center 152. Such eccentricity can introduce undesired repeated runout (RRO) error that can adversely affect the precision at which the final servo data of tracks 146 are formed.

Figure 5:
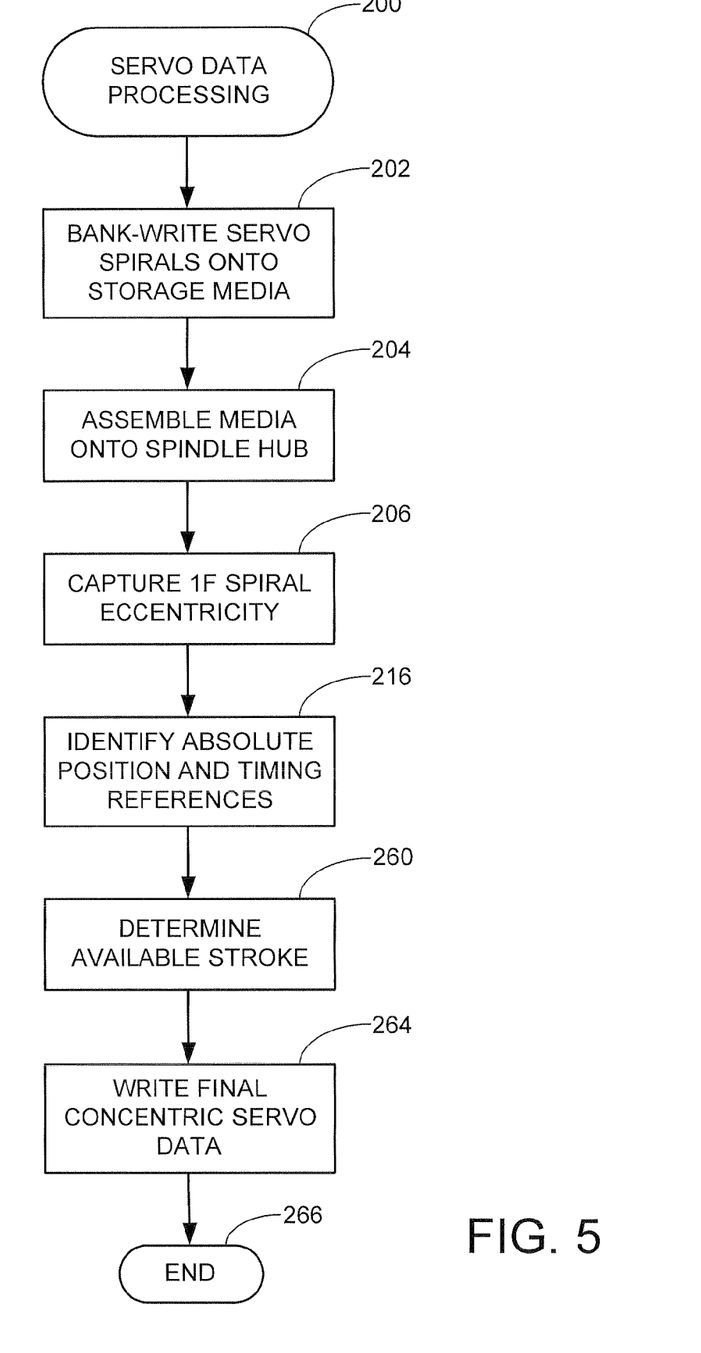
FIG. 5 provides a flow chart for a SERVO DATA PROCESSING routine, generally illustrative of steps carried out in accordance with various embodiments of the present invention to provide servo data for a control system such as the device of FIG. 1.

Accordingly, FIG. 5 sets forth a flow chart for a SERVO DATA PROCESSING routine 200, generally representative of steps carried out in accordance with various embodiments of the present invention to compensate for offsets associated with initial servo data.

At step 202, servo data such as in the form of the servo spirals 142, 144 are initially provided to a population of storage media 110 in the manner discussed previously in FIGS. 3-4.

At step 204, a selected subset of the population of pre-written storage media are assembled onto a spindle hub of a data storage device. When multiple media are installed, the media are preferably axially aligned onto the hub with the use of one or more intermediate spacers (not shown) and are clamped in place using a disc clamp (such as denoted at 205 in FIG. 1).

In this latter case, it is contemplated that at least one medium 110 may be advanced in one direction with respect to the hub 150, while at least one other medium may be advanced in another direction, so that each medium surface has its own magnitude and angle of eccentric offset between the initial servo data and the hub center 152.

It will be noted that even if efforts are specifically made to write the initial servo data during step 202 so as to be nominally aligned with the subsequent rotational center of the spindle hub, some amount of eccentricity may nevertheless be present between the initial servo data and the hub rotational center once the media are in fact installed during step 204.

The existing eccentricity of the initial servo data is captured at step 206. This preferably involves the evaluation of the primary frequency (1F) component of the RRO error, such as in accordance with FIG. 6. More specifically, so-called raw spiral data are initially demodulated and provided to the servo controller 126 via path 208. The raw data are obtained while the associated transducer 112 is nominally maintained at a consistent radius with respect to the hub 150. This can be achieved in a number of ways, such as by maintaining the actuator 114 in a biased relation against an inner or outer limit stop of the device 100.

Figure 6:
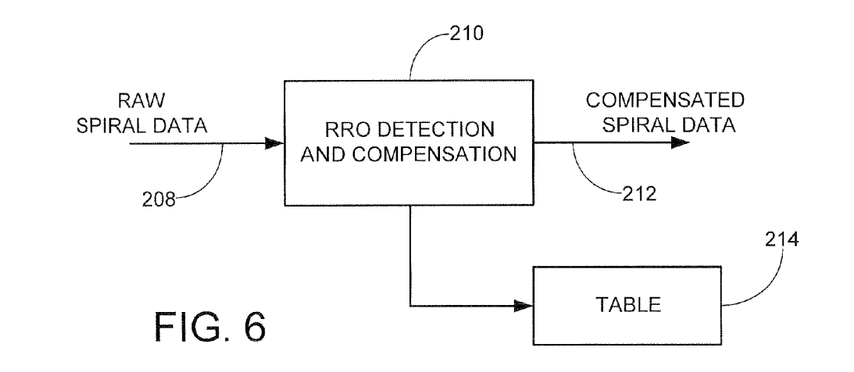
FIG. 6 depicts selected operation of the servo controller of FIG. 3 during the routine of FIG. 5 to generate RRO compensation values.

An RRO detection and compensation block 210 applies error runout correction (ERC) processing of the input servo patterns to identify the magnitude and phase of the 1F eccentricity. Corresponding compensation values can thereafter be generated which, when added to the raw data, provide compensated servo data values such as shown on path 212. The compensation values serve to cancel out the 1F eccentricity runout component to enable the servo circuit 120 to nominally define a concentric circular path around the medium 110. The compensation values are preferably stored in one or more tables 214 for access during subsequent processing.

The 1F eccentricity can readily be identified in a number of ways, such as by demodulating the servo data from the successive spirals 142, 144 and extracting the primary RRO frequency component therefrom. As desired, multiple eccentricity measurements can be taken at different radii and combined in order to assess the overall eccentricity of the initial servo data with respect to the hub center 152. It will be noted that the data obtained in FIG. 6 generally relates to the overall eccentricity of the spiral patterns, not necessarily individual errors in the placement of specific positional indicia within the spirals; preferably, the latter are compensated later during the writing of the final servo data.

Once the eccentricity of the initial servo data has been captured, the routine of FIG. 5 proceeds at step 216 to identify absolute position and timing references associated with the initial servo data. As will be appreciated, the final servo data are written in relation to the initial servo spirals as the transducer 112 is advanced across the recording surface, and relatively accurate timing and position values are continuously maintained in order to properly locate the linear wedges with respect to the spirals. Since the initial servo data were provided with a different rotational center as compared to the center of the hub, a once-per revolution reference for both timing and position are preferably derived from the compensated spirals.

In some embodiments, an annular reference pattern is provided to enable the derivation of the reference values such as a separate, circumferentially extending ring with a constant low frequency pattern (a 2T pattern, etc.). The annular reference pattern can alternatively be incorporated into one or more of the spirals 142, 144. This timing information allows identification of a once per rev timing index, and timing values can thereafter be derived in relation to elapsed time since the most recent index.

Once the timing index is identified, the position runout can be estimated and adaptive runout cancellation algorithms can be used to compensate for the remaining 1F position runout. Alternatively or additionally, one or more of the spirals can be shortened at a particular radius in order to mark the absolute position reference.

Figure 7:
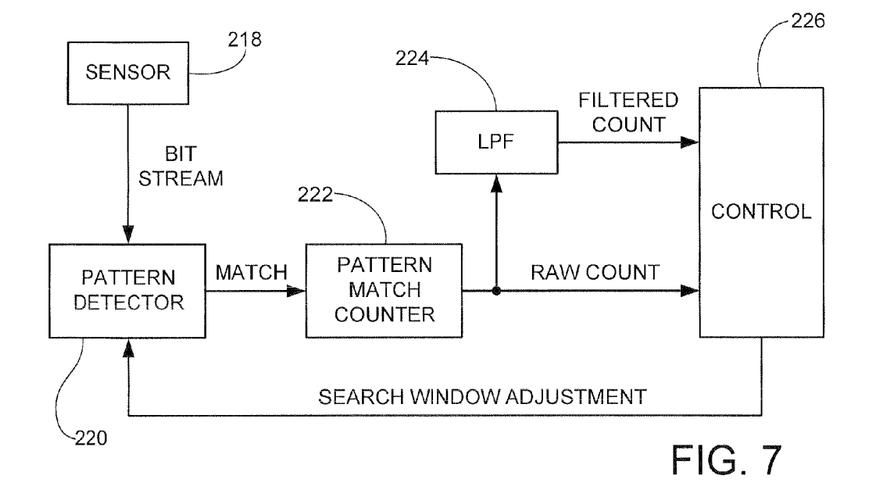
FIG. 7 depicts operation of the servo controller during the routine of FIG. 5 to detect reference patterns of the initial servo data.

A sliding window approach can be utilized to detect the reference patterns such as generally set forth by FIG. 7. A sensor block 218 provides an initially transmitted bit stream to a pattern detector block 220. The detector block 220 is preferably characterized as a matched filter and operates to examine the input bit stream to detect the reference pattern at the associated reference frequency. When the pattern detector block 220 captures a selected portion of the reference pattern at the reference frequency over a sliding interval, the block 220 outputs a match count to increment a pattern match counter 222.

The incremented counts of the counter 222 are filtered by a low pass filter (LPF) 224, and both the raw counts and the filtered counts are provided to a control block 226 as shown. The control block 226 operates to detect the reference track as well as to adaptively adjust the durations of the respective search windows in relation to the 1F eccentricity.

As noted above, the offset of the center of the initial servo data as compared to the rotational center of the hub 152 can introduce significant amounts of runout error in terms of both position and timing. The position runout can be viewed as being correlated to the physical radial distance that the initial servo data is offset from the hub center 152, and can be compensated by the use of the above RRO compensation values. That is, an associated track at some selected radius on the medium 140 as defined by the initial servo data will have a once-per-rev "wobble" that repeats in relation to the rotational velocity of the medium. The associated transducer 112 can be caused to follow a nominally concentric path (e.g., along track 146 in FIG. 4) through the use of the associated RRO compensation values which serve to reject the RRO wobble component.

However, this does not fully address the corresponding timing runout that may be present in the timing information read from the spiral servo data. Even though the servo circuit 120 will be able to maintain the transducer 112 at a fixed radius, the spiral servo data will move radially in a cyclical fashion adjacent the transducer over each revolution, inducing an associated cyclical drift in the detected frequency of the timing patterns therein.

Such drift can cause timing control circuitry of the servo circuit 120, such as a voltage controlled oscillator (VCO) or phase locked loop (PLL), to repetitively speed up and slow down the timing clock on a once-per-rev basis. The average frequency of the timing clock may be at the correct value, but a 1F RRO component will be present nonetheless. This variation in timing can induce significant errors in the placement and/or phase of the various data fields provided in the final servo wedges.

Figure 8:
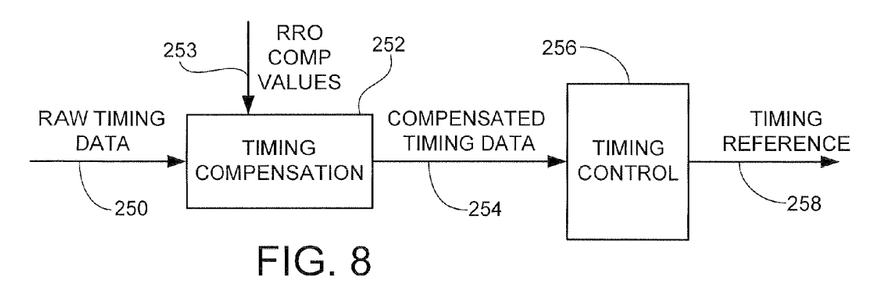
FIG. 8 depicts operation of the servo controller during the routine of FIG. 5 to compensate for timing runout.

FIG. 8 illustrates further operation of the servo circuit 120 to compensate for such timing runout in accordance with various embodiments. In FIG. 8, the transducer 112 is maintained at a nominally constant radius by serving on the initial servo spirals in conjunction with the RRO compensation values. Raw timing patterns are read from the spirals and provided via path 250 to a timing compensation block 252. The timing patterns on path 250 are contemplated as having a once-per-rev frequency drift RRO component as described above.

The timing compensation block 252 uses the RRO compensation values via path 253 to output compensated timing data patterns on path 254. The compensated timing data are at a nominally constant frequency and are generated in a number of ways, such as by estimating the output frequency in relation to the actual frequency and the radial location of the timing pattern being read with respect to the position runout. Low pass filtering techniques such as in FIG. 7 can also be used as desired.

The compensated data on path 254 are thereafter provided as an input to a timing control block 256, which outputs the associated timing reference to control the writing of the final servo data.

Continuing with the routine of FIG. 5, the effective stroke length of the initial servo data is next determined at step 260. This is carried out to accurately identify the available stroke, or radial distance, available to store the final servo data across the recording surface. As shown by seek displacement curve 262 in FIG. 9, the transducer 112 is initially biased against an outermost limit stop adjacent the OD. A seek is performed in accordance with a selected seek profile to advance the transducer 112 to a position adjacent an innermost limit stop at the ID.

Figure 9:
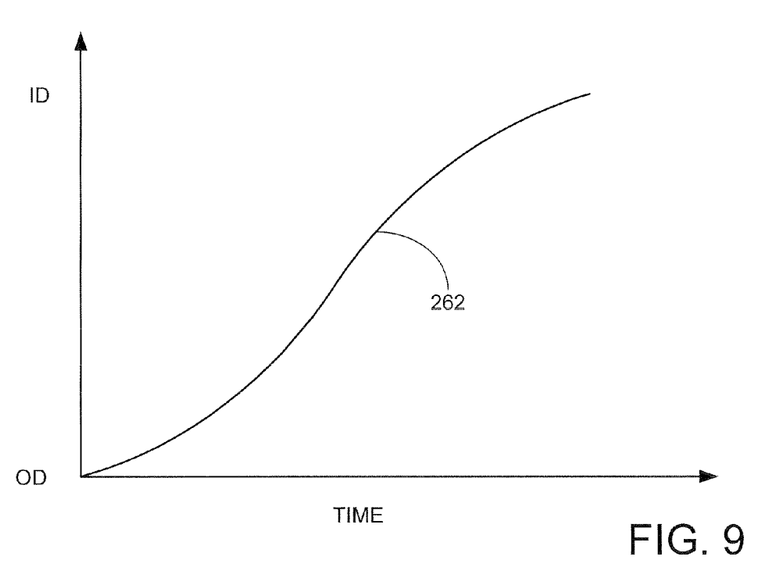
FIG. 9 shows positional displacement during a seek carried out by the routine of FIG. 5.

The seek current (or other related value) is integrated during the seek and the second limit stop is detected in relation to a substantial change in the integrated value. Multiple such seeks are preferably carried out in both directions to determine the overall stroke length and associated boundary OD and ID positions. This also allows determination of the associated number of servo data tracks to be written, as well as target width and placement values, etc.

The final servo data are thereafter written at step 264 in FIG. 5, and the routine ends at step 266. The final servo data are written in relation to the initial servo data and the compensation values as determined above to provide a series of spaced apart servo wedges 268, FIG. 10. The wedges 268 define concentric servo tracks 270 that are nominally centered upon the center of rotation 152 of the hub 150.

Figure 10:
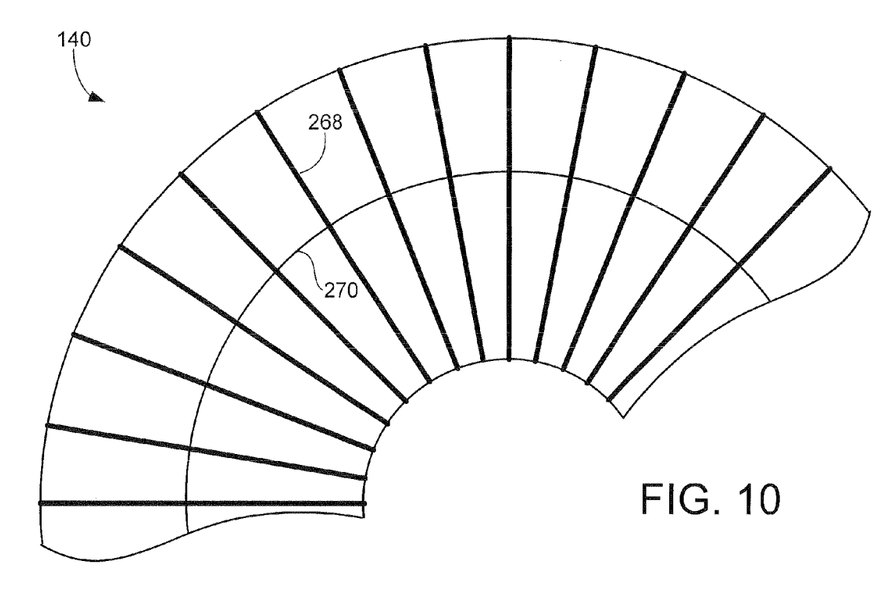
FIG. 10 generally depicts final servo data written to the storage media during the routine of FIG. 5.

The wedges 268 are written as the transducer 112 is successively advanced across the determined stroke length. At each successive radius, the initial servo data are transduced and corrected in relation to the 1F compensation values, and the appropriate timing and positional references are used to place the final servo data in the desired locations. The initial servo data may be partially or fully overwritten during this operation, and user data are subsequently stored in the portions of the tracks 270 between adjacent wedges 268.

The foregoing operations of FIG. 5 can be carried out on each recording surface in turn of a media stack in a data storage device. Alternatively, the initial servo data can be provided to a subset of the recording surfaces (e.g., one surface of a first medium in the stack) and the initial servo data can be used to control the bulk writing of the final servo data to all of the remaining recording surfaces within the stack at the same time. Preamps such as 122 in FIG. 2 can be provided with a bulk-write capability to carry out this operation.

By way of illustration, the top surface of the topmost medium 110 shown in FIG. 1 can be subjected to the initial servo data writing process of FIG. 3, and the bottom surface of the topmost medium and the top and bottom surfaces of the bottommost medium 110 in FIG. 1 can be left blank.

After installation of the respective media 110 onto the spindle motor 108, the topmost transducer 112 can be controlled in accordance with the routine of FIG. 5 and, each time the final servo data are to be written, a bulk write command is processed by the preamp 122 so that all four transducers 112 in the device 100 write the final servo data to the associated recording surface at the same time. This approach advantageously increases the processing throughput at both the writer 130 level (FIG. 3) and at the self-servo write device level.

While various embodiments have been presented herein in the environment of storage media of a data storage device, it will be appreciated that the foregoing discussion can readily be extended to any number of rotatable members in various other types of environments. For purposes of the appended claims, the recited first means will be understood to include the controller 126 configured to operate in accordance with the routine of FIG. 5.

Accordingly, it is to be understood that even though numerous characteristics and advantages of various embodiments of the invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:

bulk writing initial servo data to each of a plurality of rotatable members by mounting said plurality of rotatable members onto a first spindle hub and writing the initial servo data so as to be nominally concentric with a rotational center of the first spindle hub;

mounting a selected rotatable member of said plurality to a second spindle hub so that the initial servo data are eccentrically offset with respect to a rotational center of the second spindle hub;

determining compensation values to characterize said offset; and providing final servo data to the selected rotatable member in relation to the initial servo data and the determined compensation values, the final servo data nominally concentric with the rotational center of the second spindle hub.

2. The method of claim 1, wherein the determining step comprises identifying absolute position and timing references associated with the initial servo data.

3. The method of claim 1, wherein the bulk writing step comprises removing the plurality of rotatable members from the bulk writer spindle hub.

4. The method of claim 1, wherein the determining step comprises capturing a 1F eccentricity of the initial servo data and establishing timing and position compensation values in relation to the captured 1F eccentricity.

5. The method of claim 4, wherein the determining step further comprises measuring an effective stroke length of the initial servo data across a radial extent of the selected rotatable member from an outermost diameter (OD) to an innermost diameter (ID) of a recording surface thereof.

6. The method of claim 1, wherein the initial servo data are characterized as a plurality of spaced apart servo spirals that radially extend from an outermost diameter (OD) to an innermost diameter (ID) of a recording surface of the selected rotational member.

7. The method of claim 6, wherein the final servo data are characterized as a plurality of spaced apart servo wedges that radially extend from the OD to the ID.

8. The method of claim 7, wherein a total number of said spaced apart servo spirals is greater than a total number of said spaced apart servo wedges.

9. The method of claim 1, wherein the selected rotatable member is characterized as a storage medium and the second spindle hub is characterized as a spindle hub of a data storage device, and wherein the providing step uses a radially positionable transducer of the data storage device to write the final servo data to the storage medium.

10. The method of claim 9, wherein the selected rotatable member is characterized as a first storage medium, and wherein the mounting, determining and providing steps are concurrently performed upon a second storage medium installed in axial alignment with the first storage medium.

11. The method of claim 1, wherein the providing step comprises bulk writing the final servo data at the same time to a plurality of axially spaced apart recording surfaces mounted to the second spindle hub.

12. An apparatus comprising:

a rotatable member mounted to a spindle hub so that initial servo data previously provided to the rotatable member are eccentrically offset with respect to a rotational center of the spindle hub; and a controller which determines compensation values to characterize said offset and which provides final servo data to the rotatable member in relation to the initial servo data and the determined compensation values, the final servo data nominally concentric with the rotational center of the spindle hub, wherein the controller further measures an effective stroke length of the initial servo data across a radial extent of the rotatable member from an outermost diameter (OD) to an innermost diameter (ID) of a recording surface thereof.

13. The apparatus of claim 12, wherein the rotatable member is processed by a bulk writer to provide the initial servo data thereon prior to being mounted to the spindle hub.

14. The apparatus of claim 12, wherein the controller captures a 1F eccentricity of the initial servo data and establishes timing and position compensation values in relation to the captured 1F eccentricity.

15. The apparatus of claim 12, wherein the controller further operates to identify absolute position and timing references associated with the initial servo data.

16. The apparatus of claim 12, wherein the initial servo data are characterized as a plurality of spaced apart servo spirals that radially extend from an outer diameter (OD) to an inner diameter (ID) of a recording surface of the rotational member.

17. The apparatus of claim 12, wherein the final servo data are characterized as a plurality of spaced apart servo wedges that radially extend from the OD to the ID.

18. The apparatus of claim 12 characterized as a data storage device so that the rotatable member comprises a storage medium, the spindle hub forms a portion of a spindle motor of the data storage device, and wherein the data storage device further comprises a radially positionable transducer used to write the final servo data to the storage medium.

19. The apparatus of claim 12, wherein the controller is further configured to direct the bulk writing of the final servo data at the same time to a plurality of axially spaced apart recording surfaces mounted to the hub.

20. An apparatus comprising:
a rotatable member mounted to a spindle hub so that initial servo data previously provided to the rotatable member are eccentrically offset with respect to a rotational center of the spindle hub; and
a controller which provides final servo data to the rotatable member nominally concentric with the rotational center of the spindle hub in relation to the initial servo data and compensation values which characterize said offset, wherein the controller comprises a timing compensation block which generates compensated timing data at a nominally constant frequency by applying the compensation values to raw timing data obtained from the eccentrically offset initial servo data, the raw timing data having a once-per-revolution cyclical frequency drift.

21. The apparatus of claim 20, wherein the servo circuit further comprises a timing control block responsive to the timing compensation block which generates an absolute timing reference from the compensated timing data.

22. The apparatus of claim 20, wherein the controller further measures an effective stroke length of the initial servo data across a radial extent of the rotatable member from an outermost diameter (OD) to an innermost diameter (ID) of a recording surface thereof.

* * * * *